United States Patent
Grambihler et al.

(10) Patent No.: US 7,263,654 B2
(45) Date of Patent: Aug. 28, 2007

(54) SYSTEM AND METHOD FOR GENERATING OPTIMIZED BINARY REPRESENTATION OF AN OBJECT TREE

(75) Inventors: Roger Grambihler, Woodinville, WA (US); Peter Francis Ostertag, Woodinville, WA (US); Michael John Hillberg, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/115,330

(22) Filed: Apr. 27, 2005

(65) Prior Publication Data

US 2005/0193331 A1    Sep. 1, 2005

Related U.S. Application Data

(63) Continuation of application No. 10/715,114, filed on Nov. 18, 2003.

(51) Int. Cl.
 *G06F 17/21* (2006.01)
(52) U.S. Cl. .................................. 715/513
(58) Field of Classification Search ............ 715/513
 See application file for complete search history.

(56) References Cited

U.S. PATENT DOCUMENTS

| | | | |
|---|---|---|---|
| 6,801,224 B1 * | 10/2004 | Lewallen | 715/746 |
| 6,941,520 B1 * | 9/2005 | Lewallen | 715/762 |
| 7,007,105 B1 * | 2/2006 | Sullivan et al. | 715/513 |
| 2002/0107999 A1 * | 8/2002 | Zimmermann et al. | 709/330 |
| 2003/0137539 A1 * | 7/2003 | Dees | 345/762 |
| 2004/0111673 A1 * | 6/2004 | Bowman et al. | 715/513 |
| 2004/0143823 A1 * | 7/2004 | Wei | 717/140 |
| 2004/0230900 A1 * | 11/2004 | Relyea et al. | 715/513 |
| 2004/0230911 A1 * | 11/2004 | Bent et al. | 715/762 |

OTHER PUBLICATIONS

Boswell, David, et al., Creating Applications with Mozilla (O'Reilly Publishing—Sep. 2002).*
Powers, Shelley, Practial RDF, Chapter 14, Section 1—"Mozilla" (O'Reilly Publishing—Jul. 2003).*
Trewin, Shari, et al., "Abstract User Interface Representations: How Well do they Support Universal Access?," at CUU '03 in Vancouver, Canada (Nov. 10-11, 2003).*

* cited by examiner

Primary Examiner—Doug Hutton
(74) Attorney, Agent, or Firm—Shook, Hardy & Bacon L.L.P.

(57) ABSTRACT

A system and related techniques accept extensible application markup language (XAML) inputs corresponding to object trees, such as those representing user interface elements, and map those inputs to a binary construct. A mapping engine may generate tokenized binary outputs representing the XAML file input and ultimately the associated user interface or other object. The binary representation generated by the mapping engine may be optimized in multiple ways, including to encode dimension information such as length, width etc. of dialog boxes or other elements in the binary representation without a necessity for explicit definition. Other optimizations include the type indexing of data types when a novel instance of the type is first encountered, and embedding loader definitions to load the object or data reflected in the binary representation without having to do a lookup against loader lists.

13 Claims, 7 Drawing Sheets

Info records – Contain information about the following:

AssemblyInfo = Full name of an assembly that when loaded contains Types used in the construction of an object tree
TypeInfo = full name of the type of an object, with a reference to the Assembly record where it is defined
AttributeInfo = Full name of an attribute, or property, on an object, with a reference to the Type record that defines this attribute, and the type record that defines the type of the property.

Structure records – Contain information about the object tree structure, and make references to the info records for specific types and attributes. A full representative set of these records are:

Unknown = Placeholder for unknown record
StartDocument = Start of a XAML or BAML document
EndDocument = End of a XAML or BAML document
Element = Start of a DependencyObject
EndElement = End of a Dependency Object
ParseLiteralContent = A section of literal content that is interpreted by an object that implements the IparseLiteralContent interface
XmlnsProperty = Information about an xmlns declaration encountered in a xaml file
DependencyProperty = An attached DependencyProperty associated with a DependencyObject
RoutedEvent = Information about an Avalon RoutedEvent associated with a DependencyObject
Text = Text content under a DependencyObject or a clr object
ComplexDependencyProperty = The start of a DependencyProperty that is represented as an element subtree
EndComplexDependencyProperty = The end of a DependencyProperty that is represented as an element subtree
ClrObject = The start of a CLR object, which is an object that does not derive from DependencyObject
EndClrObject = The end of a CLR object
ClrProperty = A property on a CLR object
ClrArrayProperty = The start of an array property on a CLR object
EndClrArrayProperty = The end of an array property on a CLR object
IListProperty = The start of a property on an object that implements the IList interface
EndIListProperty = The end of an IList property
ClrComplexProperty = The start of a property on a CLR object that is represented by a tree of objects
EndClrComplexProperty = The end of a CLR complex property
IncludeTag = A reference to include another section of BAML in place of this record
IDictionaryProperty = The start of a property on an object that implements IDictionary.
EndIDictionaryProperty = The end of a property that implements IDictionary
DictionaryKeyTag = An attribute that defines a key used for placing the parent object into an IDictionary
DependencyPropertyCustom = A DepenencyObject that has its own custom binary representation
PIMapping = A mapping of assembly to CLR and XML namespace, used for type loading and resolution
ClrPropertyCustom = A CLR property that has its own custom binary respresentation

FIG. 3

```
                                                                    ┌─130
StartDocument
Version = 1.2
AssemblyInfo          - ID = 1    Name = "PresentationFramework"
TypeInfo              - ID = 1    Name = "System.Windows.Documents.DockPanel"  AssemblyID = 1
StartElement          - TypeID = 1
Xmlns                 - Prefix = ""     Value = =" http://schemas.microsoft.com/2003/xaml"
TypeInfo              - ID = 2    Name = "System.Windows.Documents.Button"      AssemblyID = 1
StartElement          - TypeID = 2
AssemblyInfo          - ID = 2    Name = "PresentationCore"
TypeInfo              - ID = 2    Name = "System.Windows.Media.Brush"          AssemblyID = 2
TypeInfo              - ID = 3    Name = "System.Windows.Controls.Panel"       AssemblyID = 1
AttributeInfo         - ID = 1    Name = "BackgroundProperty"  OwnerType = 3   PropertyType = 2
DependencyProperty    - AttributeID = 1  Value = "Blue"
EndElement
EndElement
EndDocument
```

FIG. 4

```
///<summary>
/// Serialize this object using the passed writer
///</summary>
/// <remarks>
/// This is called ONLY from the Parser and is not a general public method.
/// </remarks>
//
// Format of serialized data:
// first byte   other bytes    format
// 0AAAAAAA     none           Amount from 0 to 127 in AAAAAAA, Pixel UnitType
// 100XXUUU     one byte       Amount in byte - 0 - 255, UnitType in UUU
// 110XXUUU     two bytes      Amount in int16 , UnitType in UUU
// 101XXUUU     four bytes     Amount in int32 , UnitType in UUU
// 111XXUUU     eight bytes    Amount in double, UnitType in UUU
//
public void IBamlSerialize.SerializeOn(BinaryWriter writer, string stringValue)
{
    byte unitAndFlags = (Byte)UnitType;
    int intAmount = (int)Value;
    if ((float)intAmount == Value)
    {
        if (intAmount <= 127 &&
            intAmount >= 0 &&           // 0 - 127 and Pixel
            UnitType == UnitType.Pixel)
        {
            writer.Write((byte)intAmount);
        }
        else if (intAmount <= 255 &&
                 intAmount >= 0)        // Unsigned byte
        {
            writer.Write((byte)(0x80 | unitAndFlags));
            writer.Write((byte)intAmount);
        }
        else if (intAmount <= 32767 &&
                 intAmount >= -32768)   // Signed Short Integer
        {
            writer.Write((byte)(0xC0 | unitAndFlags));
            writer.Write((Int16)intAmount);
        }
        else                            // Signed Integer
        {
            writer.Write((byte)(0xA0 | unitAndFlags));
            writer.Write(intAmount);
        }
    }
    else                                // Double
    {
        writer.Write((byte)(0xE0 | unitAndFlags));
        writer.Write((Double)Value);
    }
}
```

SYSTEM AND METHOD FOR GENERATING OPTIMIZED BINARY REPRESENTATION OF AN OBJECT TREE

CROSS-REFERENCE TO RELATED APPLICATION

This application is a continuation of application Ser. No. 10/715,114, filed Nov. 18, 2003 from which application priority is hereby claimed. The subject matter of this application is related to the subject matter of U.S. patent application Ser. No. 10/715,709 entitled "Method and System for Mapping Tags to Classes Using Name Spaces" filed on Nov. 18, 2003, which application is assigned or under obligation of assignment to the same entity as this application, and which application is incorporated herein by reference.

STATEMENT REGARDING FEDERALLY SPONSORED RESEARCH OR DEVELOPMENT

Not applicable.

FIELD OF THE INVENTION

The invention relates to the field of computer programming, and more particularly to a platform for transforming extensible application markup language code into compact, optimized binary representations of those sources, including representations of user interface and other elements.

BACKGROUND OF THE INVENTION

The use of extensible markup language (XML) technology in browser and other technology has expanded and continues to grow. Because XML represents documents and other data and objects in an innately hierarchical or tree-based fashion, ordered relationships, parsing, searching and other operations and constructs may be relatively easily or naturally constructed and used. The use of XML has consequently progressed from browser applications to database, operating system and other applications. XML may now be extended to supporting the user interface and other components of systems and applications for example through the use of extensible application markup language (XAML), which permits programmers to encode operating system, application and other elements in object-rooted hierarchical format.

However, while XML has enjoyed increasingly standardized use in a range of applications, the platform is not without certain drawbacks or disadvantages. Significant among those are the fact that XML-based representations of documents or objects are typically larger than some other formats, such as binary files or others. While computer storage and network capacity continue to grow, even with comparatively rich client or network resources XML/XAML-based data may demand significant amounts of time to load onto a client machine or download over a network. Application load times are a facet of computer performance most closely perceived by users as affecting system responsiveness. So while the deployment of XML and related technology continues to grow, techniques to make the platform more efficient in storage and use are desirable. Other disadvantages of conventional XML-related technology exist.

SUMMARY OF THE INVENTION

The invention overcoming these and other problems in the art relates in one regard to a system and method for generating an optimized binary representation of an object tree, in which a mapping engine accepts an extensible application markup language input, for instance a XAML representation of a binary object tree corresponding to user interface elements. The mapping engine may transform the relatively verbose XAML construct for user interface elements or other objects to a tokenized binary representation of that same XAML and associated object. In embodiments, the binary representation of the XAML and associated object may be made more compact or otherwise optimized for storage, loading and transmission through various techniques. Optimization mechanisms may include for instance the encoding of object dimension information in the binary output stream, for example to encode the length and width of a dialog box or other element by positioning a byte representing length, width etc. in a predefined place in the binary stream. Other binary optimizations include the type indexing of novel data types in the data stream in the first instance they are encountered, and the embedding of identifiers for loaders which may called to load an object encapsulated in the binary output stream.

BRIEF DESCRIPTION OF THE DRAWINGS

FIG. 2 illustrates an information record schema associated with the binary representation output generated according to embodiments of the invention.

FIG. 3 illustrates a structure record schema associated with the binary representation output generated according to embodiments of the invention.

DETAILED DESCRIPTION OF EMBODIMENTS

Figure 1:
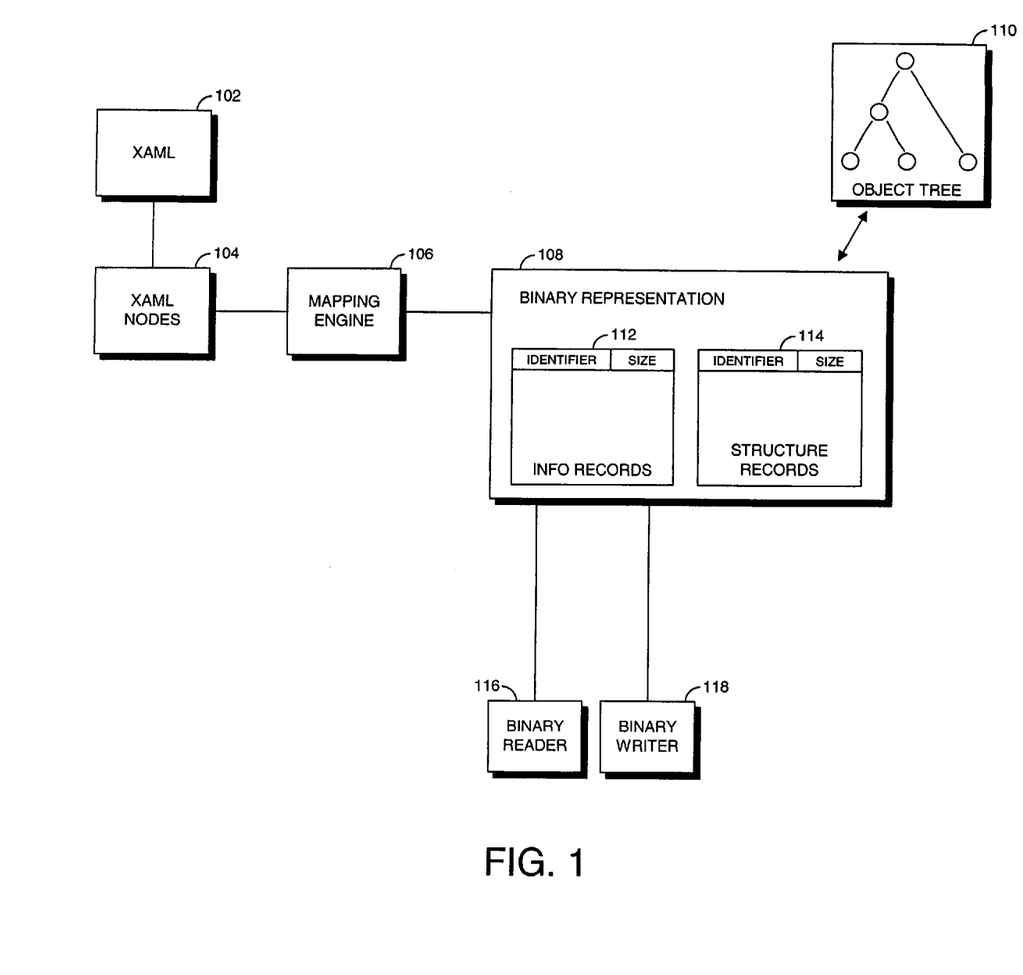
FIG. 1 illustrates an overall architecture in which an embodiment of the optimized binary generator of the invention may operate.

FIG. 1 illustrates an architecture in which a system and method for generating an optimized binary representation of an object tree may operate, according to an embodiment of the invention. As illustrated in that figure, in embodiments source XAML 102 may be used to represent or generate a set of XAML nodes 104, those nodes corresponding to the structure of an object tree 110. The object tree 110 may represent, for example, user interface elements such as dialog boxes, icons, buttons, borders or other elements or resources used in operating systems or other code. According to the invention, the XAML nodes 104 may be transmitted to a mapping engine 106 as an input for transformation to binary form.

More specifically, mapping engine 106 may include parser logic, tables and associated resources to detect incoming XAML data in the form of XAML nodes 104 from source XAML 102 or otherwise, and generate a corresponding binary representation 108 of those XAML nodes 104. The binary representation 108 may in one regard encapsulate the information characterizing object tree 110 in binary form. In embodiments, the binary representation 108 may include tokenized decompositions of XAML data, with common assembly, attribute and other information hoisted to common files to make the representation more compact.

As illustratively shown in FIG. 1, the binary representation 108 may consist of at least two components, namely information records 112 and structure records 114. Those records as illustrated may themselves embed fields including identifiers to indicate whether a given record is of information, structure or other type. In embodiments size fields may likewise indicate the overall size of one or more records in the set of binary records 130, but formats may vary. In embodiments, the binary representation 108 may be generated from a live object tree as opposed to a stored file containing source XAML 102 or other data. The binary representation 108 may be transmitted to a binary reader 116 or receive data from a binary writer 118, for purposes of interfacing to other resources. Mapping engine 106 may likewise communicate with or make use of binary reader 116 or binary writer 118 to map or generate binary objects or outputs.

In terms of more detailed composition of the records making up binary representation 108, FIG. 2 illustrates an information record schema 126 for information records 112, which as shown includes assembly information, type information and attribute information used to define the types, attributes and other information used to load and generate the eventual representation of object tree 110. FIG. 3 conversely illustrates a structure record schema 128 for structure records 114, which as shown includes various classes of tags, tokens and other identifiers, attributes and placeholders which may be used to build the representation of object tree 110. Other schema and interior attributes may be used in the information records 112 and structure records 114.

It may be noted that in embodiments, the binary representation 108 may be constructed such that the information records 112 are always available before they are referenced by any structure records 114. According to the invention in one regard, as noted the information records 112 may contain an ID field which is unique to a given binary representation 108 and may be used to uniquely identify assemblies, types and attributes. When structure records 114 are written out, they may contain an index of associated ID records for the type and attribute information. For example, consider the following XAML expression, which may form an instance of source XAML 102: Expression 1

```
<DockPanel xmlns=" http://shcmeas.microsoft.com/2003/xaml">
    <Button Background="Blue"/>
</DockPanel>
```

Figure 4:
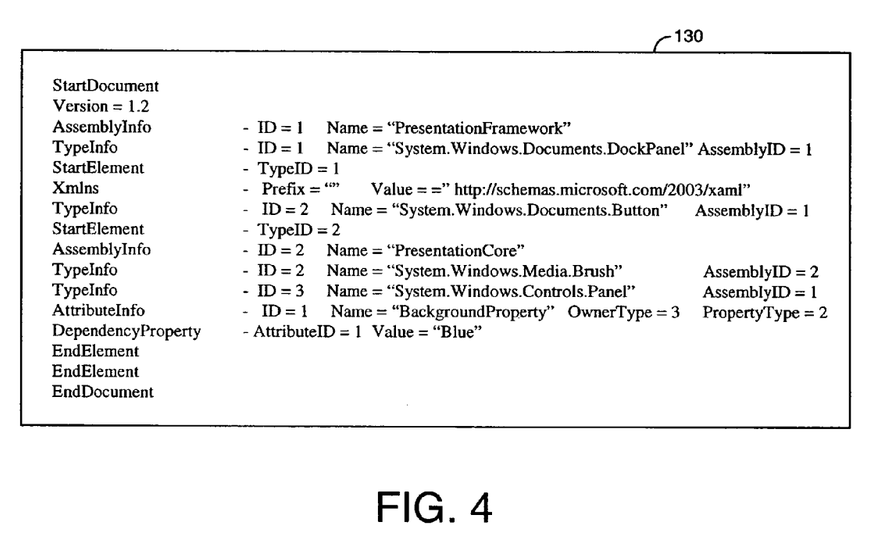
FIG. 4 illustrates binary records associated with an illustrative output generated according to embodiments of the invention.

Upon receipt by the mapping engine 106, this source XAML 102 may be used to generate the associated set of binary records 130 illustrated in FIG. 4. In the illustrative record, it may be noted that every information record 112 is written out before it is referred to. When reading the set of binary records 130 associated with binary representation 108 via binary reader 116 or otherwise, assembly and attribute information may be used to build tables of information used to construct a representation of the object tree 110 and set properties.

In embodiments, the set of binary records 130 may be further compressed or optimized by use of implicit structure records 114, that is, by employing one or more of structure records 114 whose type is known by the system and is fixed. According to such embodiments in one regard, the structure records 114 which are implicitly defined need not be actually written out by or in the binary representation 108 and associated components, since their type is understood. For example in operating system environments, certain user interface types and controls may always be incorporated into the set of available objects. Those types or controls may include common interface constructs such as a button, cursor or others.

In such instances, if a binary representation 108 or constituent record wishes to reference a "button" type control, it may not be necessary to explicitly write out a button type record, since a known type ID may be reserved for that or other known operating system-related or other classes. For example, rather than write out a record of the variety "TypeInfo–ID=2 . . . " as illustratively shown in FIG. 4, a StartElement record for a button element may simply contain a negative number entry of "ID=−12" or other identifier understood to reference that class. Other tags or identifiers may be used. Implicit typing in this fashion may further optimize storage space, transmission time and other performance factors.

According to another aspect of the invention, the binary representation 108 may again be optimized in regards to the fact that an attribute in XAML may typically be a property on an object. The definer of that property may be the object itself, or some other class. When the defining class is external to the object, locating that class can be expensive in terms of load time and other performance measures. However according to embodiments of the invention, identification of associated classes may be performed during the mapping process and encoded in the binary representation 108 itself. This encoding may be reflected as the type ID in an attribute information record.

According to embodiments of the invention in another regard, the mapping engine 106 and other platform resources may generate and transmit the binary representation 108 in serialized form. During serial transmission, storing a string for a property value each time it appears may be inefficient, because of the space required for character information and because executing a parser (such as Type-Converter used in the Microsoft Windows™ family) at runtime to parse the string and find a corresponding loader or other resource may be costly. It may therefore offer gains in loading and other efficiency to have the binary object which is represented by the embedded string to perform a custom serialization to its own privately defined binary format. For example, Length type may be used to provide Width and Height for user interface controls, as in the following example source XAML 102:

Expression 2

<Button Width="100*px*" Height="50*px*"/>

Figure 5:
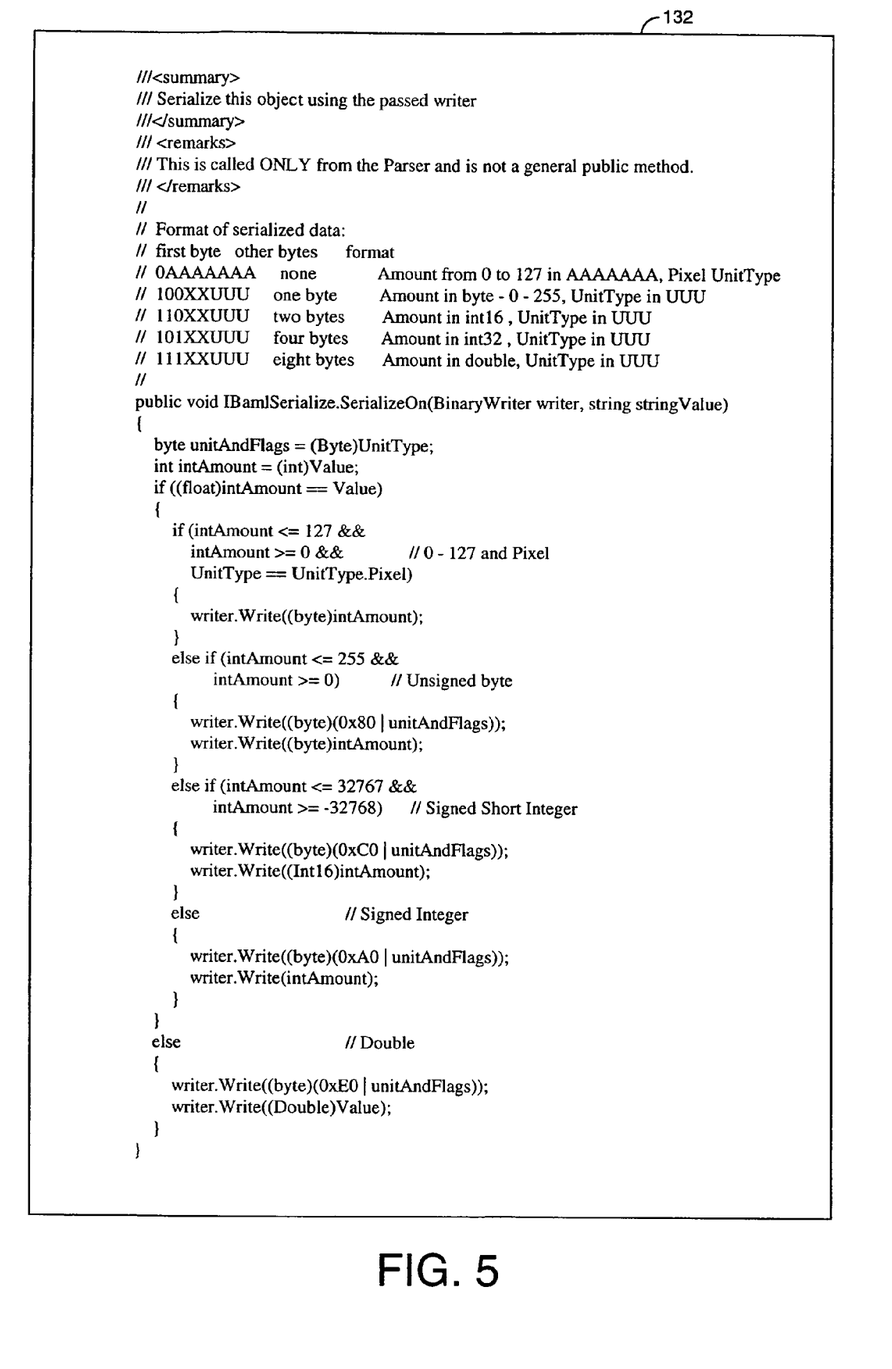
FIG. 5 illustrates a binary serialization generated according to embodiments of the invention.

If a type implements serialization interfaces configured to be consistent with the invention, it may be called upon when a stream of binary representation 108 is constructed to serialize itself directly into the stream in its own custom defined format resulting in compact storage and transmission requirements. The Length (or other dimensional) type can exploit this type of capability effectively, resulting in typical cases in a requirement of only 1 byte to specify the length of an object in a binary stream. FIG. 5 for example shows illustrative code for performing a serialization for a Length type. Other implementing code is possible. The binary representation 108 and associated records may thus likewise be optimized by generating a type index for novel types (such as Length) upon encountering the first instance of those types. Loading times may also therefore be enhanced.

Figure 6:
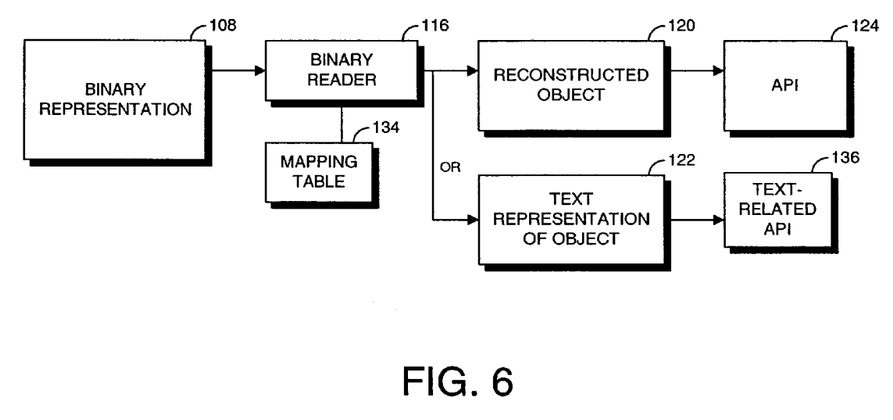
FIG. 6 illustrates a reconstruction of an object from a binary representation, according to embodiments of the invention.

In terms of use of the binary representation 108 once it is generated according to embodiments of the invention, as illustrated in FIG. 6 the mapping engine 106 may likewise communicate with a binary reader 116, that module being configured to receive and transmit the binary representation 108 and communicate with a mapping table 134 and other resources. Mapping table 134 may contain lookup tables or other entries storing common attributes, types and other information which may be used to extract hoisted or encoded information from binary representation 108. As shown in FIG. 6, the binary reader 116 may for instance be invoked to read the binary representation 108 and generate a reconstructed object 120 corresponding to object tree 110 or other output. That output may be used for example to expose a dialog box or other user interface element or other object to an application programming interface 124. The application programming interface 124 may interface to applications such as browsers, databases or other client or network applications to call system or other resources. In embodiments, as illustrated the binary reader 116 may also generate a text representation 122 of the object tree 110 for transmission to a text-related application programming interface 136 or other applications or resources.

Figure 7:
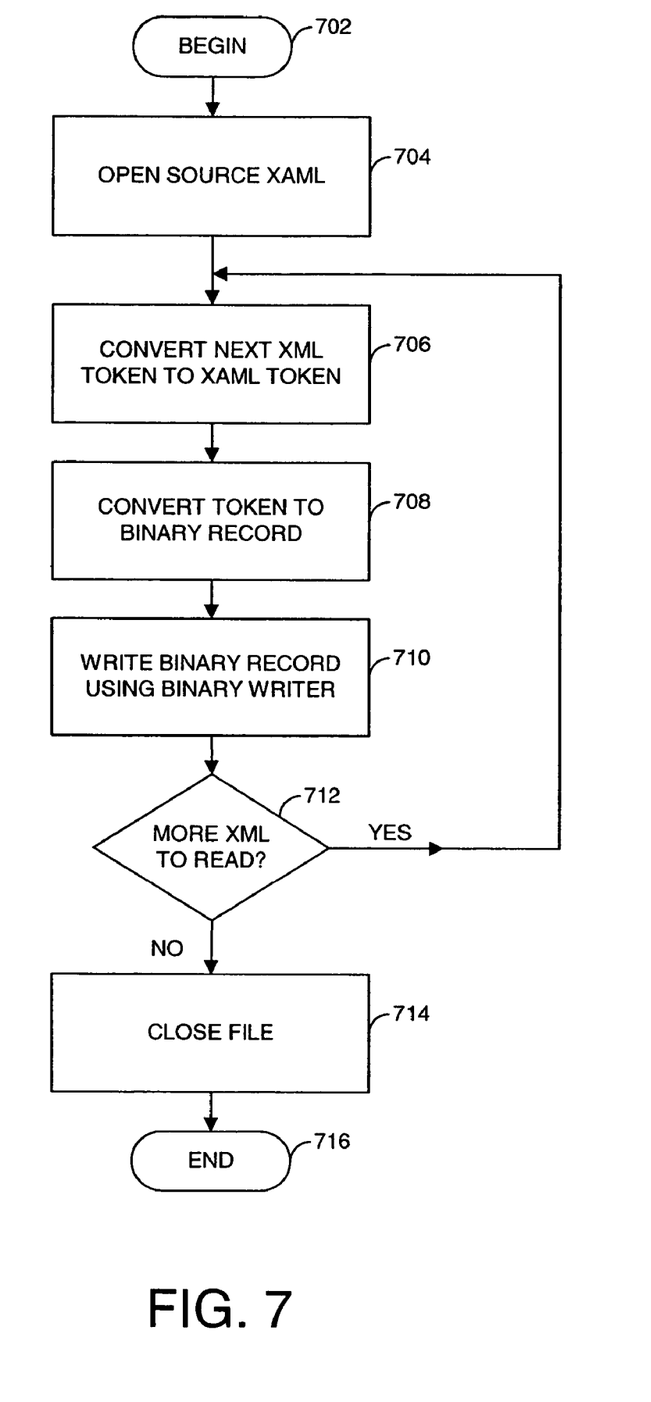
FIG. 7 illustrates a flowchart of processing to generate a converted binary representation of source XAML, according to embodiments of the invention.

FIG. 7 illustrates aspects of processing which may be used to generate a converted binary representation of source XAML 102, according to embodiments of the invention. In step 702, processing may begin. In step 704, source XAML 102 may be loaded or opened in mapping engine 106 or otherwise. In step 706, the next (or initial) XML token may be converted to a XAML token. In step 708, the XAML token may be converted to a binary record, for instance as part of the set of binary records 130. In step 710, the binary representation record may be written to the set of binary records 130 or other locations, for instance using binary writer 118. In step 712, a determination may be made whether there is additional XML to be read from source XAML 102 or otherwise. If there is additional XML input to be read, processing may return to step 706 to map the next XML token to a XAML token. If there is no additional XML input to be read, processing may proceed to step 714 where a file containing the set of binary records 130 may be closed. In step 716, processing may repeat, terminate or return to a prior processing point.

Figure 8:
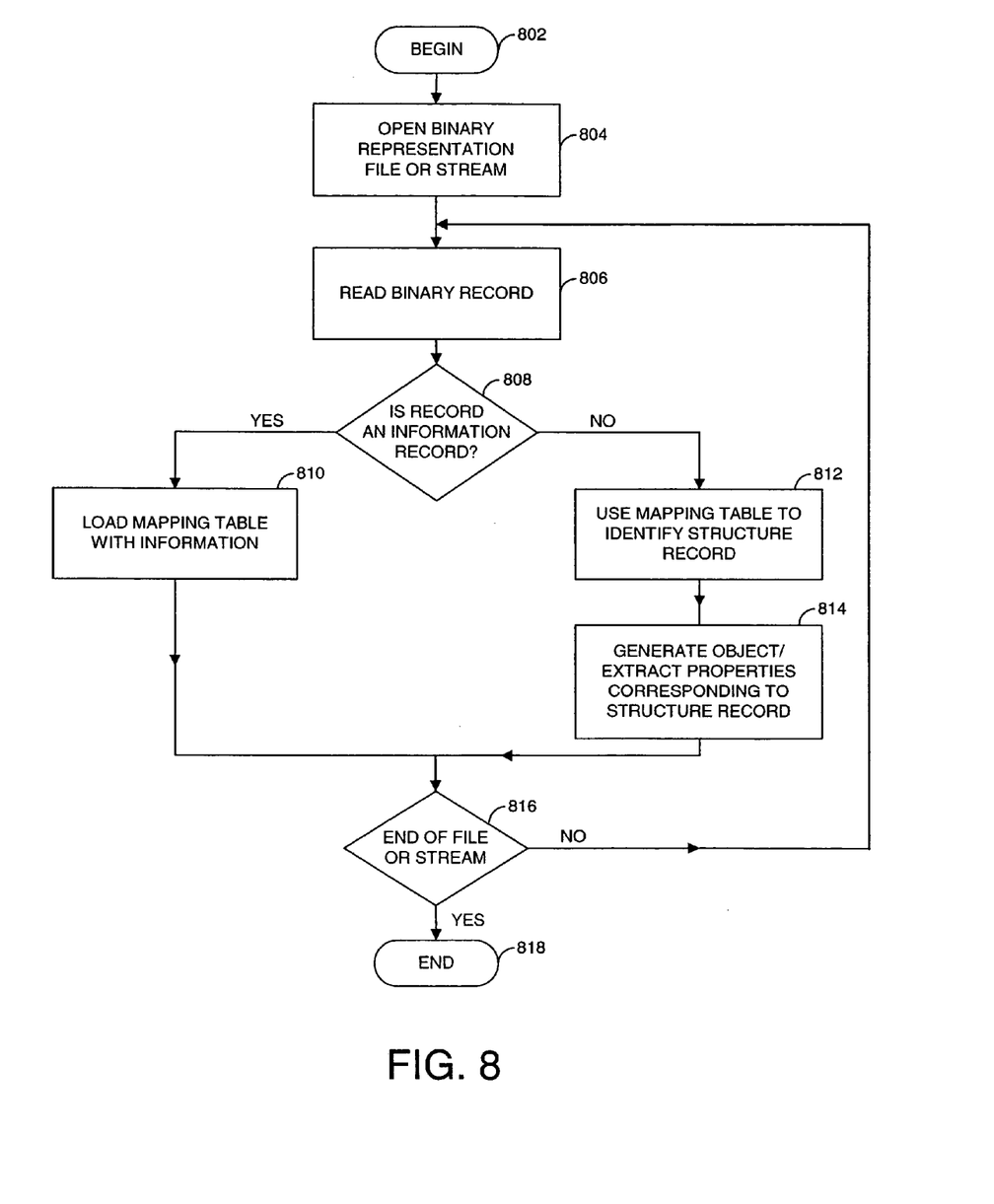
FIG. 8 illustrates a flowchart of processing to read out a binary representation of a XAML-based object to generate a representation of that object, according to embodiments of the invention.

FIG. 8 illustrates aspects of processing which may be used to read out a binary representation 108 of a XAML-based object such as an object tree 110 to generate a representation of that object, according to embodiments of the invention. As shown in that figure, in step 802, processing may begin. In step 804, a binary representation 108 may be accessed or opened, for example from a file or a data stream. In step 806, a record in the set of binary records 130 contained in or associated with binary representation 108 may be read, for instance using binary reader 116. In step 808, a determination may be made whether the current record is an information record, as opposed to a structure record.

If the current record is determined to be an information record, processing may proceed to step 810 in which mapping table 134 may be loaded with information from or associated with the information record. Processing may then proceed to step 816 where a determination may be made whether the end of the file or stream has been encountered. If the end of the file or stream has been encountered, control may proceed to step 818 where processing may repeat, terminate or return to a prior processing point. If the determination in step 816 is that the end of the file or data stream has not been reached, then processing may conversely return to step 806 to read a next binary record in the set of binary records 130.

If in step 808 the current record is determined to not be an information record, processing may proceed to step 812 where the mapping table 134 may be used to identify the structure record or a type of the structure record being processed, for instance as part of the set of structure records 114. In step 814, an object such as an object tree 110 may be generated corresponding to the identified structure record, for instance from a set of classes for user interface or other applications. It may be noted that in embodiments a structure record may identify properties on objects, rather than an object directly. In such cases, in step 814 properties on an object may alternatively be extracted, for instance using a custom type converter or other resources. Processing may then proceed to step 816, where a test may be made for end-of-file conditions as described.

The foregoing description of the invention is illustrative, and modifications in configuration and implementation will occur to persons skilled in the art. For instance, while the invention has generally been described in terms of the generation of a binary representation 108 of source XAML 102 which both exist or load on a client machine, in embodiments either of the source XAML 102, XAML nodes 104, binary representation 108 and binary tree 110 could, for instance, be distributed locally or remotely, for instance to serve binary representation 108 from a remote server to a client or other machine.

Similarly, while the invention has in embodiments been described as encapsulating user interface elements originally encoded in a binary application markup language such as XAML, the mapping from source input to binary format may in instances be performed on other code, data or interfaces. Other hardware, software or other resources described as singular may in embodiments be distributed, and similarly in embodiments resources described as distributed may be combined. Further, while the invention has in one regard been illustratively described in terms of a binary representation 108 decomposed into information records 112 and structure records 114, in implementations the types and schema for the actual binary format may vary. The type and nature of optimizations performed on or used to produce binary representation 108 may moreover be extended beyond the indexing and other types described. The scope of the invention is accordingly intended to be limited only by the following claims.

We claim:

1. A method for generating a data structure encoding data in media, comprising:
   receiving extensible application markup language information corresponding to an object tree; and
   generating an optimized binary representation of extensible application markup language information corresponding to the object tree, the optimized binary representation comprising:
      an information record including encoded:
         assembly information comprising at least one first identifier of one or more known object types in the extensible application markup language to invoke an associated loader of the known object types,
         type information indicating a type of an object associated with the object tree, and
         attribute information indicating an attribute of an object associated with the object tree, the attribute information including at least one second identifier of one or more classes associated with at least one object of the object tree; and
      a structure record including an encoded structure property of the object tree,
   wherein the information record and the structure record are both used to reconstruct the object tree.

2. The method according to claim 1, wherein the structure record comprises at least one of a start document record, an end document record, a dependency property record, an array property record, a tag record, a custom property record and a text record.

3. The method according to claim 1, wherein the object tree corresponds to user interface elements.

4. The method according to claim 1, wherein the generating of the optimized binary representation is performed by at least one of a client device, an operating system and an application.

5. A data structure encoding data in media, the data structure tangibly embodied on one or more computer-readable media, comprising:
   an optimized binary representation of extensible application markup language corresponding to an object tree, the optimized binary representation information comprising:
      an information record the information record including encoded:
         assembly information comprising at least one first identifier of one or more known object types in the extensible application markup language to invoke an associated loader of the known object types,
         type information indicating a type of an object associated with the object tree, and
         attribute information indicating an attribute of an object associated with the object tree, the attribute information including at least one second identifier of one or more classes associated with at least one object of the object tree; and
      a structure record including an encoded structure property of the object tree,
   wherein the information record and the structure record are both used to reconstruct the object tree.

6. The data structure according to claim 5, wherein the structure record comprises at least one of a start document record, an end document record, a dependency property record, an array property record, a tag record, a custom property record and a text record.

7. The data structure according to claim 5, wherein the object tree corresponds to user interface elements.

8. The data structure according to claim 5, wherein the optimized binary representation is accessible by at least one of a binary reader and a binary writer.

9. A system, embodied on a tangible computer readable medium, for generating the data structure according to claim 5.

10. A method of reading a data structure encoded in media, comprising:
    accessing an optimized binary representation of extensible application markup language information corresponding to an object tree, the optimized binary representation comprising:
       an information record including encoded:
          assembly information comprising at least one first identifier of one or more known object types in the extensible application markup language to invoke an associated loader of the known object types,
          type information indicating a type of an object associated with the object tree, and
          attribute information indicating an attribute of an object associated with the object tree, the attribute information including at least one second identifier of one or more classes associated with at least one object of the object tree; and
       a structure record encoding including an encoded structure property of the object tree; and
    decoding the optimized binary representation to reconstruct the object tree:
    wherein the information record and the structure record are both used to reconstruct the object tree.

11. The method according to claim 10, wherein the structure record comprises at least one of a start document record, an end document record, a dependency property record, an array property record, a tag record, a custom property record and a text record.

12. The method according to claim 10, wherein the object tree corresponds to user interface elements which are reconstructed via the decoding.

13. The method according to claim 10, wherein the decoding of the optimized binary representation is performed by at least one of a client device, an operating system and an application.

* * * * *